United States Patent [19]

Hariter

[11] 3,884,878

[45] May 20, 1975

[54] OXALYL CYANIDE

[75] Inventor: Donald R. Hariter, Wilmington, Del.

[73] Assignee: E. I. du Pont de Nemours & Company, Wilmington, Del.

[22] Filed: Mar. 14, 1973

[21] Appl. No.: 341,248

Related U.S. Application Data

[62] Division of Ser. No. 54,617, July 13, 1970, Pat. No. 3,763,161.

[52] U.S. Cl............................................. 260/545 R
[51] Int. Cl........................................ C07c 121/20
[58] Field of Search ................................ 260/545 R

[56] References Cited

UNITED STATES PATENTS 3,234,265  2/1966  Krekeler ........................ 260/465.4

FOREIGN PATENTS OR APPLICATIONS 1,563,737  3/1969  France ............................ 260/545 R Primary Examiner—Robert Gersil

[57] ABSTRACT

The novel compound oxalyl cyanide and related compounds are obtained, for example, from diiminosuccinonitrile and/or diaminomaleonitrile.

1 Claim, No Drawings

OXALYL CYANIDE

RELATED APPLICATION

This application is a division of my copending application Ser. No. 54,617 filed July 13, 1970, now U.S. Pat. No. 3,763,161 of Oct. 2, 1973.

BACKGROUND OF THE INVENTION

1. Field of the Invention

This invention relates to oxalyl cyanide and certain related cyano-substituted pyrazines and their synthesis.

2. Relation to Prior Art

Pyrazines, as a class of heterocyclic compounds, have long been known.

H. Bredereck and G. Schmötzer, Ann. 600, 95 (1956), for example, reported the preparation of 2,3-dioxo-1,2,3,4-tetrahydropyrazine-5,6-dinitrile (X), related to the present novel pyrazines:

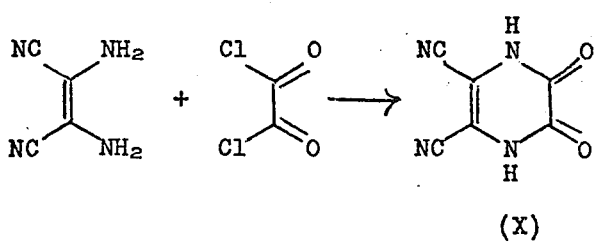

(X)

The pyrazines of this invention, however, have not been reported. Several other compounds including oxalyl cyanide as well as the synthesis of the present invention are similarly new.

Webster U.S. Pat. No. 3,564,039 of Feb. 16, 1971, discusses the relatively novel compound diiminosuccinonitrile and the known hydrogen cyanide tetramer, diaminomaleonitrile.

SUMMARY AND DETAILS OF THE INVENTION

This invention is primarily concerned (A) with the reaction of diiminosuccinonitrile with diaminomaleonitrile and (B) with the family of ten products obtained therefrom, all but one of which are new compositions of matter.

The nine new products are as follows: (I) tetracyanopyrazine; (II) 2-hydroxy-3,5,6-tricyanopyrazine; (III) 2-amino-3,5,6-tricyanopyrazine; (IV) 2-amino-3-hydroxy-5,6-dicyanopyrazine; (V) 2,3-diamino-5,6-dicyanopyrazine; (VI) 2,5-diamino-3-cyano-6-imino-4-azahepta-2,4-dienedinitrile; (VII) 2,5,6,9-tetraamino-3,8-dicyano-4,7-diazadeca-2,4,6,8-tetraenedinitrile; (VIII) α-iminooxalyl cyanide; and (IX) oxalyl cyanide.

As noted above, the tenth compound, 2,3-dioxo-1,2,3,4-tetrahydropyrazine-5,6-dinitrile (X), has been prepared by another route.

The process of this invention involves the reaction of diiminosuccinonitrile with diaminomaleonitrile in the presence or absence of a Lewis acid, Lewis base, a liquid reaction medium (solvent) and/or water. When water is present, all 10 of the numbered compounds above are formed. When water is absent, only compounds (I), (III), (V), (VI) and (VII) are formed.

By varying the amount and type of Lewis acid, Lewis base, reaction medium and/or water as well as the time of reaction, it is possible to alter the proportions of the products formed so that the individual products can be isolated. This is most surprising in view of the complexity of the chemical reaction and the large number of products that are always present, at least in minimal amounts. Compounds (VI), (VIII) and (IX) are best isolated after relatively short reaction times since compound (VI) cyclizes to form compound (V), compound (VIII) reacts further to form compounds (III) and (IV) and compound (IX) reacts further to form compounds (I), (II), and (X).

A Lewis acid is a substance that can accept one or more electrons from another substance to form a chemical bond. Lewis acids include not only protonic materials such as the specific acids mentioned throughout the specification, but also aprotonic materials such as boron trifluoride, silicon tetrachloride, phosphorus pentoxide, sulfur dioxide, aluminum chloride, antimony pentachloride, ferric chloride, stannic chloride, boron trichloride, titanium tetrachloride, zinc bromide, zinc chloride, and the like.

A Lewis base is a substance that can donate one or more electrons to another substance to form a chemical bond. Lewis bases include the strongly basic aqueous solutions of metal oxides and hydroxides such as sodium and potassium hydroxides as well as weaker basic materials such as ammonium hydroxide and alkyl- and aryl-substituted amines.

The presence of a liquid reaction medium is not essential, since diiminosuccinonitrile and diaminomaleonitrile can be induced to react by long term impact grinding as in a hammer mill or ball mill. However, it is preferred to carry out the reaction in the presence of an organic liquid which is inert to the reactants and products. Particularly preferred are the aprotic organic liquids, e.g., nitriles such as acetonitrile and benzonitrile, ethers such as diethyl ether, tetrahydrofuran, ethylene glycol dimethyl ether and diethylene glycol dimethyl ether, and hydrocarbons such as hexane, benzene, toluene and xylene. Some of the most useful of these aprotic liquids are the ones which are water miscible. When one of the reactants is a liquid, an excess of that reactant may serve as a reaction medium. For example, an excess of a Lewis acid such as trifluoroacetic acid may serve as a reaction medium. Similarly, an excess of a Lewis base such as triethylamine or N,N-dimethylaniline can serve as reaction medium.

The process of this invention may be carried out in the temperature range from −80° to 200°C. It is preferred to operate in the range from 0° to 100°C.

Pressure is not a critical variable in the process of this invention. Pressures above and below atmospheric pressure may be employed. Atmospheric pressure is preferred for convenience.

The proportions of diiminosuccinonitrile and diaminomaleonitrile which may be brought together to carry out the process of this invention may be varied widely, since any proportions used will give at least some of the products. Molar ratios from 1:20 to 20:1 may be employed, and respective molar proportions in the range from 5:1 to 1:6 are preferred.

The five dicyanopyrazines (Compounds I-V) of the general structural formula:

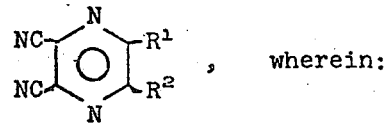, wherein:

$R^1$ may be cyano, amino, or hydroxy and $R^2$ may be cyano or amino, are all made from diiminosuccinonitrile and/or diaminomaleonitrile by processes that constitute an important part of the invention. The several syntheses are closely related and are described in detail below.

2,3-Diamino-5,6-dicyanopyrazine (V), the compound of the general formula in which $R^1=R^2=NH_2$, can be prepared more simply than the other compounds, e.g., by heating diaminomaleonitrile and cyanogen or by reaction of diaminomaleonitrile with sodium hydride at 5°–10°C., followed by addition of cyanogen at −30° to −35°C. The preferred synthesis, however, is the sulfuric acid-catalyzed condensation of diiminosuccinonitrile with diaminomaleonitrile in acetonitrile solution. V can also be prepared by the cyclization of VI.

The other pyrazines of the invention are formed by complex reactions in which the reaction mechanisms are not fully known. One explanation of the several courses of the reaction is based on the observation that p-toluenesulfonic acid (TsOH) precipitates as the ammonium salt (NH₄TsO), i.e., ammonium tosylate, on reaction with diiminosuccinonitrile, presumably to form α-iminooxalyl cyanide:

Addition of diaminomaleonitrile to the above solution followed by heating, if desired, results in the formation of pyrazines. When one mole proportion of p-toluenesulfonic acid per mole of diiminosuccinonitrile is employed, the pyrazines 2-amino-3,5,6-tricyanopyrazine, III, and 2-amino-3-hydroxy-5,6-dicyanopyrazine, IV, are formed:

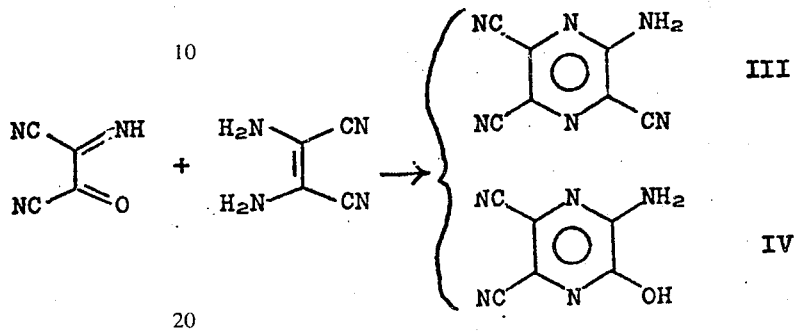

When two moles of p-toluenesulfonic acid per mole of diiminosuccinonitrile are used, subsequent reaction with diaminomaleonitrile yields the pyrazines I and II, along with 2,3-dioxo-1,2,3,4-tetrahydropyrazine-5,6-dinitrile (X). The analogous intermediate in these reactions may reasonably be oxalyl cyanide:

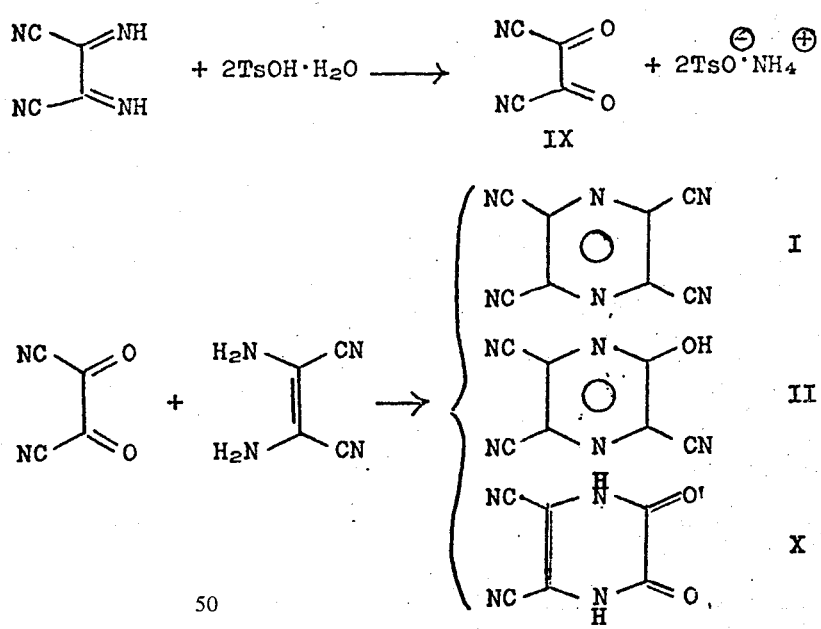

The hydrolysis of diiminosuccinonitrile to yield compounds VIII and IX may be effected by water and any strong mineral acid such as sulfuric, phosphoric, hydrochloric, hydrobromic, and phosphorus acids, as well as by organic acids having dissociation constants above $1 \times 10^{-3}$. The latter class of acids includes the alkane- and arenesulfonic acids and alkane- and arenecarboxylic acids, such as mono-, di- and trichloroacetic acids, the bromoacetic acids, the fluoroacetic acids, oxalic acid, maleic acid, and p-nitrobenzoic acid. The arenesulfonic acids are preferred on the basis of availability and insolubility of the ammonium salts in the solvents

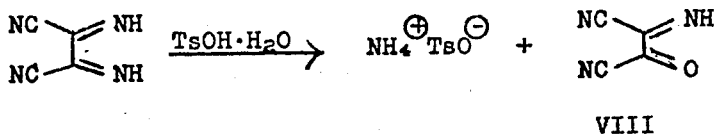

VIII used in the invention.

The preferred solvents for the syntheses of this invention are tetrahydrofuran, acetonitrile, diethyl ether, water, and aqueous acids. Other solvents include glycol dimethyl ether, dioxane, trifluoroacetic acid and alcohol solutions of acids such as hydrochloric or sulfuric acids.

EMBODIMENTS OF THE INVENTION

There follow some nonlimiting examples illustrative of the invention in more detail.

EXAMPLE 1

Preparation of tetracyanopyrazine (see U.S. Pat. No. 3,763,161) can be achieved by reaction of diaminomaleonitrile with oxalyl cyanide (IX) as follows:

A solution of 38 g. (0.2 mole) of p-toluenesulfonic acid monohydrate in 50 ml. of tetrahydrofuran was added, over a 12-minute period, to a solution of 10.6 g (0.1 mole) of diiminosuccinonitrile in 65 ml. of tetrahydrofuran. Stirring was continued for 25 minutes. As shown in Example 2, the resulting reaction mixture was a solution of oxalyl cyanide. To this solution 21.0 g. (0.2 mole) of trifluoroacetic acid was added. Next, a solution of 10.8 g. (0.1 mole) of diaminomaleonitrile in 100 ml. of tetrahydrofuran was added to the above stirred solution over a 15-minute period. The mixture was stirred at room temperature for about 20 hours. The mixture was filtered, the solid rinsed with tetrahydrofuran and the combined filtrates evaporated to a thick paste. The resultant semisolid was slurried with water and the precipitated product, tetracyanopyrazine, collected. On drying, 8.2 g. (48%) of tetracyanopyrazine, I, was obtained.

EXAMPLE 2

Oxalyl cyanide is a somewhat unstable compound that has now been found to be a useful chemical intermediate (see Examples 1, 3 and 4). The synthesis of the compound is described as follows:

All operations were conducted in a nitrogen atmosphere. A solution of 19.0 g. (0.1 mole) of toluenesulfonic acid monohydrate in 100 ml. of tetrahydrofuran was added dropwise (ca. 30 minutes) to a solution of 5.3 g. (0.5 mole) of diiminosuccinonitrile in 300 ml. of tetrahydrofuran. Occasional cooling was needed to maintain the reaction temperature near 25°C. As hydrolysis of the diiminosuccinonitrile is substantially instantaneous, the reaction was finished on completion of the addition. The precipitated ammonium tosylate was filtered and rinsed with tetrahydrofuran, the combined filtrates evaporated at low temperature and the residual orange solid sublimed. This yielded about 0.68 g. of oxalyl cyanide, IX.

Oxalyl cyanide is fully characterized by the following analyses:

Anal.
Calcd. for $C_4N_2O_2$: C, 44.49; H, 0. ; N, 25.93
Found: C, 44.46; H, 0.26; N, 25.93
　　　　　44.43　　　　0.46　　　25.67

IR: 2230 cm.$^{-1}$ (C ≡ N); 1735 cm.$^{-1}$ (C=O)
M.P. 61°–62°C.

Mass Spectrum:

| m/e (meas.) | m/e (calcd.) | Assignment |
|---|---|---|
| 107.9953 | 107.9960 | $C_4N_2O_2$, molecular ion–M$^+$ |
| 82 | low resolution | M+–CN |
| 54 | do. | M+/2 |
| 26 | do. | –CN |

EXAMPLE 3

Part A

Under nitrogen at 20°C a solution of 19.0 g of p-toluenesulfonic acid monohydrate in 50 ml of tetrahydrofuran was added dropwise over a period of ten minutes to a solution of 5.3 g of diiminosuccinonitrile in 50 ml of tetrahydrofuran. Ammonium p-toluenesulfonic precipitated. This mixture was stirred at 20°C for 30 minutes. The solvent was evaporated at reduced pressure leaving a yellow solid product.

Part B

Pure oxalyl cyanide was sublimed from the product in Part A and led directly into a solution of 1.0 g of diaminomaleonitrile in 50 ml of tetrahydrofuran. The resulting solution was stirred at room temperature overnight and then evaporated to dryness. Infrared analysis of the product showed it to be substantially pure 2,3-dioxo-1,2,3,4-tetrahydropyrazine-5,6-dinitrile (X).

EXAMPLE 4

The procedure of Example 3, Part A, was repeated. Pure oxalyl cyanide was sublimed from the product and led directly into a solution of 1.0 g of diaminomaleonitrile, 0.5 g of diaminomalononitrile p-toluenesulfonate and 0.5 g of ammonium p-toluenesulfonate in 60 ml of tetrahydrofuran. The resulting solution was stirred at room temperature for 3 hours and the solid content separated by chromatography to obtain 1.12 g of tetracyanopyrazine (I).

The embodiments of the invention in which an exclusive property or privilege is claimed are defined as follows:

1. Oxalyl cyanide.

\* \* \* \* \*

UNITED STATES PATENT OFFICE
CERTIFICATE OF CORRECTION

PATENT NO. : 3,884,878
DATED : May 20, 1975
INVENTOR(S) : Donald R. Hartter

It is certified that error appears in the above-identified patent and that said Letters Patent are hereby corrected as shown below:

Cover sheet - Hartter is misspelled.

Col. 5, line 46 - "0.5" should be --0.05--.

Col. 6, line 26 - correct spelling of "p-toluenesulfonate".

Signed and Sealed this eleventh Day of May 1976

[SEAL]

Attest:

RUTH C. MASON
Attesting Officer

C. MARSHALL DANN
Commissioner of Patents and Trademarks